United States Patent
Archambault et al.

(10) Patent No.: US 11,522,629 B2
(45) Date of Patent: Dec. 6, 2022

(54) CHANNELIZED OPTICAL AMPLIFIERS AND AMPLIFIER ARRAYS

(71) Applicant: Ciena Corporation, Hanover, MD (US)

(72) Inventors: Jean-Luc Archambault, Ottawa (CA); Rathy Shankar, Kanata (CA); Damian Flannery, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/154,216

(22) Filed: Jan. 21, 2021

(65) Prior Publication Data

US 2022/0231778 A1   Jul. 21, 2022

(51) Int. Cl.
| | | |
|---|---|---|
| *H04B 10/29* | (2013.01) | |
| *H04J 14/02* | (2006.01) | |
| *H04B 10/25* | (2013.01) | |
| *H01S 3/16* | (2006.01) | |
| *H01S 3/067* | (2006.01) | |

(Continued)

(52) U.S. Cl.
CPC .......... *H04J 14/021* (2013.01); *H01S 3/0677* (2013.01); *H01S 3/06716* (2013.01); *H01S 3/06766* (2013.01); *H01S 3/1608* (2013.01); *H04B 10/25* (2013.01); *H04B 10/29* (2013.01); *H04B 10/294* (2013.01); *H04B 10/2935* (2013.01); *H04J 14/02* (2013.01); *H04Q 11/0001* (2013.01)

(58) Field of Classification Search
CPC ....... H04J 14/021; H04J 14/02; H01S 3/0677; H01S 3/1608; H01S 3/06716; H01S 3/06766; H01S 3/06754; H01S 3/06758; H01S 3/094061; H01S 2301/04; H04B 10/25; H04B 10/29; H04B 10/2935; H04B 10/294; H04Q 11/0001
USPC .................................. 398/43–103, 173–181
See application file for complete search history.

(56) References Cited

U.S. PATENT DOCUMENTS

| | | | | |
|---|---|---|---|---|
| 5,889,610 A | * | 3/1999 | Fatehi | H04B 10/032 359/341.43 |
| 5,892,615 A | | 4/1999 | Grubb et al. | |

(Continued)

FOREIGN PATENT DOCUMENTS

| | | |
|---|---|---|
| CA | 2 189 568 C | 10/2002 |
| CA | 3 089 139 A1 | 11/2019 |

(Continued)

*Primary Examiner* — Dibson J Sanchez
(74) *Attorney, Agent, or Firm* — Clements Bernard Baratta; Lawrence A. Baratta, Jr.; Christopher L. Bernard (57) ABSTRACT

Systems and methods are provided for amplifying optical signals within one of two optical bands, such as C-band and L-band. An optical amplifying device, according to one implementation, may include a shared optical coil configured to propagate an optical signal. The optical amplifying device may further include a first junction configured to separate the shared optical coil into a first-band optical fiber and a second-band optical coil and a pump device configured to amplify the optical signal in the shared optical coil and the second-band optical coil. The first-band optical fiber may be configured to propagate the optical signal when the optical signal resides in a channel of a first plurality of channels within a first optical band. The second-band optical coil may be configured to propagate the optical signal when the optical signal resides in a channel of a second plurality of channels within a second optical band.

20 Claims, 8 Drawing Sheets

(51) Int. Cl.
*H04Q 11/00* (2006.01)
*H04B 10/293* (2013.01)
*H04B 10/294* (2013.01)

(56) References Cited

U.S. PATENT DOCUMENTS

| | | | |
|---|---|---|---|
| 5,905,745 A | 5/1999 | Grubb et al. | |
| 5,959,767 A * | 9/1999 | Fatehi | H04Q 11/0005 398/1 |
| 6,078,422 A * | 6/2000 | Kosaka | H04B 10/2931 398/1 |
| 6,115,403 A | 7/2000 | Brenner et al. | |
| 6,259,555 B1 * | 7/2001 | Meli | H04J 14/0221 359/337 |
| 6,275,632 B1 | 8/2001 | Waarts et al. | |
| 6,310,716 B1 * | 10/2001 | Evans | H04B 10/2916 398/79 |
| 6,407,863 B1 | 6/2002 | Archambault et al. | |
| 6,424,459 B1 * | 7/2002 | Yokota | H04B 10/2942 359/341.42 |
| 6,424,569 B1 * | 7/2002 | Parker | G11C 11/5621 365/185.18 |
| 6,459,516 B1 | 10/2002 | Mizrahi et al. | |
| 6,510,000 B1 * | 1/2003 | Onaka | H01S 3/302 359/334 |
| 6,614,567 B1 * | 9/2003 | Al-Salameh | H04J 14/02 398/79 |
| 6,614,959 B1 | 9/2003 | Mizrahi et al. | |
| 6,795,607 B1 | 9/2004 | Archambault et al. | |
| 6,882,466 B1 * | 4/2005 | Shimojoh | H01S 3/06758 359/334 |
| 7,119,950 B2 * | 10/2006 | Ohshima | H01S 3/06754 359/337.11 |
| 7,231,107 B1 | 6/2007 | Zhong et al. | |
| 7,254,327 B1 | 8/2007 | Zhong et al. | |
| 7,693,357 B2 | 4/2010 | Marrakchi El Fellah et al. | |
| 7,809,272 B2 | 10/2010 | Zhong et al. | |
| 7,962,049 B2 | 6/2011 | Mateosky et al. | |
| 8,457,497 B2 | 6/2013 | Zhong et al. | |
| 8,467,688 B2 | 6/2013 | Archambault et al. | |
| 8,625,994 B2 | 1/2014 | Archambault et al. | |
| 8,817,245 B2 | 8/2014 | Archambault et al. | |
| 9,140,624 B2 | 9/2015 | Bao et al. | |
| 9,419,708 B2 | 8/2016 | Rad et al. | |
| 9,680,569 B2 | 6/2017 | Archambault et al. | |
| 10,237,633 B2 | 3/2019 | Chedore et al. | |
| 10,250,326 B2 | 4/2019 | Bao et al. | |
| 10,263,386 B1 | 4/2019 | Sridhar et al. | |
| 10,277,311 B2 | 4/2019 | Archambault et al. | |
| 10,277,352 B2 | 4/2019 | Chedore et al. | |
| 10,374,704 B2 | 8/2019 | Archambault et al. | |
| 10,454,609 B2 | 10/2019 | Chedore et al. | |
| 10,630,417 B1 | 4/2020 | Chedore et al. | |
| 10,746,602 B2 | 8/2020 | Pei et al. | |
| 2002/0003644 A1 * | 1/2002 | Shimomura | H04J 14/0206 385/16 |
| 2002/0041431 A1 * | 4/2002 | Ohshima | H04B 10/2916 359/334 |
| 2002/0054427 A1 * | 5/2002 | Islam | H04B 10/2916 359/349 |
| 2002/0191276 A1 * | 12/2002 | Onaka | H01S 3/06758 359/341.2 |
| 2003/0021010 A1 * | 1/2003 | Motoshima | H04B 10/296 359/337 |
| 2005/0179989 A1 * | 8/2005 | Osaka | H04B 10/2916 359/334 |
| 2009/0003830 A1 * | 1/2009 | Fishman | H04J 14/02 398/97 |
| 2010/0221021 A1 * | 9/2010 | Onaka | H04B 10/671 398/208 |
| 2011/0085231 A1 * | 4/2011 | Bolshtyansky | H01S 3/06754 359/341.33 |
| 2011/0274431 A1 * | 11/2011 | Warren | H04J 14/0221 398/94 |
| 2012/0121255 A1 * | 5/2012 | Sakamoto | H04B 10/2939 398/48 |
| 2012/0218625 A1 * | 8/2012 | Mino | H04J 14/0221 359/334 |
| 2016/0315708 A1 * | 10/2016 | Kachita | H04B 10/2942 |
| 2017/0122812 A1 * | 5/2017 | Bhatnagar | G01J 3/50 |
| 2017/0214483 A1 * | 7/2017 | Bolshtyansky | H04B 10/291 |
| 2017/0214484 A1 * | 7/2017 | Zhang | H04B 10/294 |
| 2018/0234749 A1 * | 8/2018 | Chedore | H04Q 11/0005 |
| 2020/0007262 A1 | 1/2020 | Chedore et al. | |
| 2020/0099450 A1 * | 3/2020 | Mikami | H04B 10/294 |
| 2020/0153502 A1 * | 5/2020 | Buset | H04B 10/03 |
| 2020/0194961 A1 * | 6/2020 | Luo | H01S 3/06766 |
| 2020/0374001 A1 | 11/2020 | Chedore et al. | |
| 2021/0067264 A1 * | 3/2021 | Abe | H04J 14/0209 |
| 2021/0376550 A1 * | 12/2021 | Foursa | H04B 10/2935 |

FOREIGN PATENT DOCUMENTS

| | | |
|---|---|---|
| EP | 1 284 528 A2 | 2/2003 |
| EP | 2 564 532 B1 | 10/2017 |
| WO | 9419713 A1 | 9/1994 |

\* cited by examiner

FIG. 13

CHANNELIZED OPTICAL AMPLIFIERS AND AMPLIFIER ARRAYS

TECHNICAL FIELD

The present disclosure generally relates to optical network systems and methods. More particularly, the present disclosure relates to optical amplifiers and optical amplifier arrays allowing amplification of channels in multiple optical wavelength bands.

BACKGROUND

Generally, optical networks are advancing toward the utilization of wider bandwidths within the optical spectrum for allowing signals to occupy more optical channels. This allows more data traffic to flow through fiber links within the network. In particular, the C-band (i.e., the band occupying a portion of the optical spectrum having wavelengths ranging from about 1528 nm to about 1567 nm) has been used in recent years. More recently, the L-band (i.e., the band occupying a portion of the optical spectrum having wavelengths ranging from about 1570 nm to be about 1611 nm) and portions thereof have been used (or at least considered) for expanding the operational optical spectrum of many optical networks to what is referred to as the C+L-band.

Currently, Reconfigurable Optical Add/Drop Multiplexers (ROADMs) used in the C+L band have been designed to include separate multiplexer (mux) and demultiplexer (demux) structures for C-band and L-band channels. This means that C-band and L-Band channels must be connected to different ROADM ports. Accordingly, existing Erbium-Doped Fiber Amplifier (EDFA) array solutions, which are needed for low power transceivers, are designed to amplify channels in either the C-band or the L-band, but not both. In the future, network operators may want to see more integration of components for use in the C+L-band, such as designs where mux/demux ports are truly colorless across both bands.

Similarly, current coherent modems are only capable of operating across a single band (C-band or L-band). The modems often include channel EDFAs to provide gain in that specific band. Integrated C+L-band EDFAs may be present in some line amplifier applications, but they are typically designed as independent C-band and L-band EDFAs co-packaged together, so that channels in both bands can be amplified simultaneously. This tends to be very costly as it doubles the number of components required to build the amplifier.

Current C+L-band ROADM designs are only colorless within one band. Therefore, there is a need for designs that are colorless across both bands. Also, there is a need for systems where modems can be tunable across both bands, which is not supported by the current amplifier technology. Furthermore, conventional C+L-band EDFAs tend to be very expensive and bulky as they use parallel designs with duplicate components for the two bands. Thus, the design can be an overkill for applications with a single channel or only a few channels. Therefore, there is also a need in the field of optical networks to provide ROADMs where there is an opportunity to share components in order to reduce the cost and size of amplifier devices of optical networks.

BRIEF SUMMARY

According to one implementation of the present disclosure, an optical amplifying device may include a shared optical coil configured to propagate an optical signal. The optical amplifying device may further include a first junction configured to separate the shared optical coil into a first-band optical coil and a second-band optical coil. Also, the optical amplifying device may include a pump device configured to amplify the optical signal in both the first-band optical coil and the second-band optical coil. The first-band optical coil, for example, may be configured to propagate the optical signal when the optical signal resides in a channel of a first plurality of channels within a first optical band. Also, the second-band optical coil, for example, may be configured to propagate the optical signal when the optical signal resides in a channel of a second plurality of channels within a second optical band.

According to another implementation of the present disclosure, a method is provided that includes the step of allowing an optical signal to propagate from a shared optical coil to a first-band optical coil in response to determining that the optical signal resides in a channel of a first plurality of channels within a first optical band. The method may also include amplifying the optical signal on the first-band optical coil by a first amount. The method may further include allowing the optical signal to propagate from the shared optical coil to a second-band optical coil in response to determining that the optical signal resides in a channel of a second plurality of channels within a second optical band. Also, the method can include the step of amplifying the optical signal on the second-band optical coil by a second amount that is different from the first amount.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Since low power transceivers may be used, Erbium-Doped Fiber Amplifier (EDFA) array solutions may be used for amplification of optical signals of low power transceivers. The EDFA devices can be used may include pluggable coherent Dense Wavelength Division Multiplexing (DWDM) devices, such as 400G Quad Small Form-factor Pluggable (QSFP) devices, Double-Density QSFP (QSFP-DD), 400G-ZR, 400-ZR+, etc. The EDFA devices may be designed to amplify channels in either the C or L band but not both.

For low power transmitted transponders, transceivers, modems, etc., such as 400G ZR and 400G ZR+, the transmitter signal may need to be amplified before it is launched in an optical networking system to meet the system budget power requirements. According to various implementations, a modem in an optical fiber communication network may be configured to send and/or receive optical signals through optical fibers. In some cases, a modem may be referred to as a transceiver or a group of transceivers.

An amplifier, which can work for both C-band and L-band with dedicated amplification for each signal, may be desirable for certain types of modem cards. In some cases, it may be desirable for the provisioning of colorless Reconfigurable Optical Add/Drop Multiplexer (ROADM) solutions that are band-agnostic (i.e., where a ROADM add/drop port can accept any channel at any wavelength within the C and L bands). Simple amplifier control mechanisms with cost optimized solutions, as described herein, may be attractive for these applications.

Solutions of single-channel amplifiers and arrays of amplifiers are provided in the present disclosure. The embodiments of these various amplifiers and amplifier arrays may provide an independent channelized amplification with a simplified operational mechanism. The amplifier arrangements described herein are configured to take advantage of the fact that because only one channel is present, the EDFA can be configured to amplify a channel in the C-band or the L-band, but does not need to provide gain in both bands at the same time. Thus, this observation can lead to configurations that may be less complex and may be less expensive compared to having parallel EDFAs.

Further solutions may include amplifiers having an additional pre-combiner. This arrangement may also be attractive as a viable solution for pre-combiners for Channel Mux-Demux (CMD) modules in a line system or as a booster amplifier for multi-channel single span systems, such as in Data Center Interconnection (DCI) networks. These embodiments may be operational to provide the condition that the channels within the same band can be combined.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Single-Channel Amplifiers

Some embodiments of single-channel optical amplifiers for use in an optical network are described below with respect to FIGS. 1-5. These figures include similar optical layouts for depicting various features as described in the present disclosure. Although, the embodiments of FIGS. 1-5 pertain to single-channel amplifiers, it should be recognized that multiple single-channel amplifiers can be combined together in an array as such in FIGS. 6-9.

Figure 1:
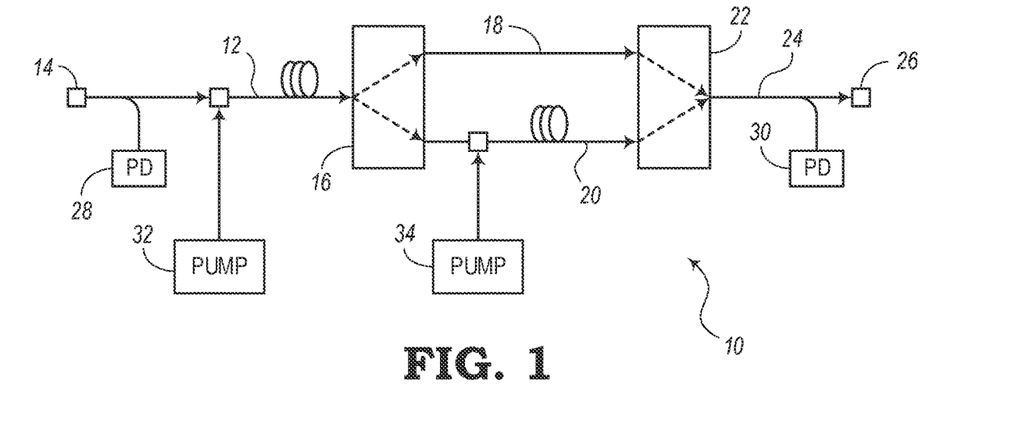
FIGS. 1-5 are schematic diagrams illustrating different examples of optical amplifying devices having similarities with one another, according to various embodiments of the present disclosure.

FIG. 1 is a schematic diagram of an optical amplifying device 10, which may also be referred to as an optical amplifier or other apparatus for amplifying optical signals. The optical amplifying device 10 is configured to amplify optical signals in a single channel and may therefore be referred to as a single-channel optical amplifier. The optical amplifying device 10 includes a shared optical coil 12 for receiving an optical signal from an input port 14. For example, the optical signal received by the shared optical coil 12 may reside in any single channel within two optical bands (e.g., the C-band and the L-band).

In addition, the optical amplifying device 10 includes a first junction 16 that is configured to propagate the optical signal from the shared optical coil 12 to one or both of a first-band optical fiber 18 and a second-band optical coil 20. The first junction 16 may be configured to separate the optical signal such that channels in the first optical band (e.g., C-band) are applied to the first-band optical fiber 18 and channels in the second optical band (e.g., L-band) are applied to the second-band optical coil 20. The optical amplifying device 10 further includes a second junction 22, which may be configured to combine the first-band optical fiber 18 and the second-band optical coil 20 together to be applied to an output path 24 that is connected to an output port 26. According to the embodiments of FIGS. 1-3, the first junction 16 is configured as a 1×2 optical switch and the second junction 22 is configured as a 2×1 optical switch to enable propagation on one of the two parallel paths (i.e., the first-band optical fiber 18 or the second-band optical coil 20). The shared optical coil 12 and the second-band optical coil 20 may include Erbium-Doped Fiber (EDF) coils. A coil, as used herein, is a length of optical fiber including multiple turns. That is, the coil is used to provide a length of optical fiber that includes a gain medium, e.g., Erbium doping, and the fiber is provided in a coil so it can be provided in a module or the like.

Furthermore, the optical amplifying device 10 may include an input detection device 28 tapped into the shared optical coil 12 near the input port 14 for detecting the optical signal received on the shared optical coil 12. Also, the optical amplifying device 10 may include an output detection device 30 tapped into the output path 24 near the output port 26 for detecting the amplified optical signal provided at the output of the optical amplifying device 10. The input detection device 28 and output detection device 30 may be photo-detectors. In some embodiments, the input detection device 28 may be configured to detect whether the optical signal resides in a channel of a plurality of channels in the first optical band (e.g., the C-band) or resides in a channel of a plurality of channels in the second optical band (e.g., the L-band). In this case, the input detection device 28 may provide an indication to the first junction 16 (e.g., 1×2 optical switch) to switch the optical signal to the first-band optical fiber 18 if it resides in one or more of the channels in the first optical band or to switch the optical signal to the second-band optical coil 20 if it resides in one or more of the channels in the second optical band.

For example, the C-band may only require amplification via the shared optical coil 12 whereas the L-band may require additional amplification, namely via both the shared optical coil 12 and the second-band optical coil 20.

According to the embodiment of FIG. 1, the optical amplifying device 10 may further include a first optical pump 32 and a second optical pump 34. The first and second optical pumps 32, 34 may be configured as laser amplifying pump devices that are tapped into the various paths of the optical amplifying device 10 for providing amplification at different points therein. For example, the first optical pump 32 may be configured for amplifying the shared signal on the shared optical coil 12 by a baseline amount. The second optical pump 34 may be configured for amplifying the optical signal in the second-band (e.g., L-band) on the second-band optical coil 20. The second optical pump 34 may be configured for providing extra amplification for signals operating in a lower frequency (i.e., higher bandwidth) optical range in which a greater amplification may be needed. As shown in the embodiment of FIG. 1, the first optical pump 32 and the second optical pump 34 are configured to pump (amplify) the shared optical coil 12 and the L-band optical coil 20 independently to allow for controllable levels of amplification for the first band (e.g., C-band) and the second band (e.g., L-band) as needed.

Figure 2:
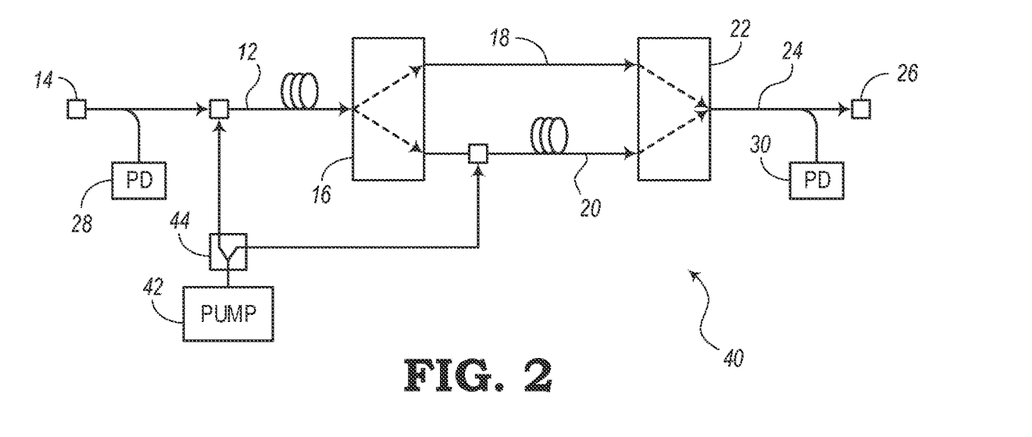

FIG. 2 is a schematic diagram showing an embodiment of an optical amplifying device 40, which has many similarities to the optical amplifying device 10 of FIG. 1. In this embodiment, the only difference is that a single optical pump 42 is used in place of the two independent optical pumps 32, 34 shown in FIG. 1. A similar result can be achieved by using the single optical pump 42, whereby a pump splitter 44 can be used to control how much amplification is applied to the shared path (i.e., shared optical coil 12) and how much is applied to the second path (i.e., second-band optical coil 20). It should be recognized that the pumping action of the two systems, using either the dual pumps (FIG. 1) or a single pump with a pump splitter (FIG. 2), the first-band optical fiber 18 will propagate the optical signal of channels in the first band having been amplified once in the shared path, whereas the second-band optical coil 20 will propagate the optical signal of channels in the second band having been amplified twice (i.e., once in the shared path and another time in the second-band optical coil 20). Although the single pump with the pump splitter configuration (FIG. 2) is depicted in the embodiments described below, it should be understood that these embodiments may alternatively use the dual pump configuration (FIG. 1).

Figure 3:
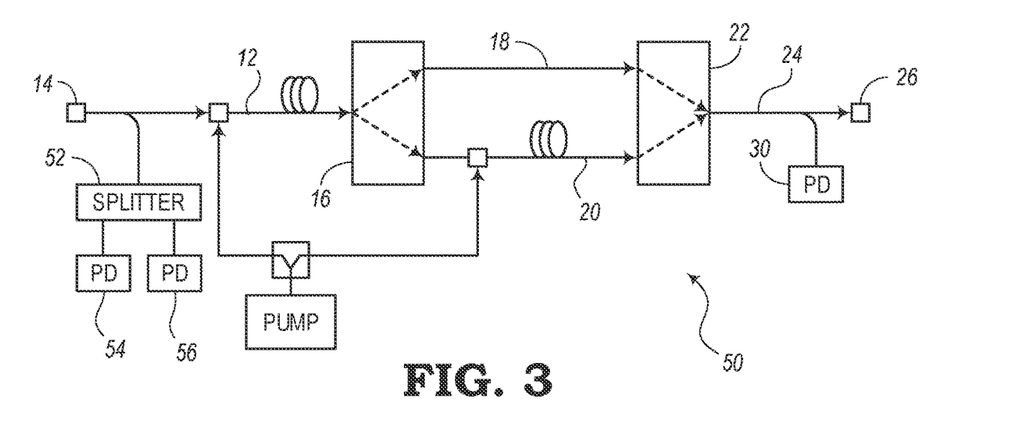
Figure 4:
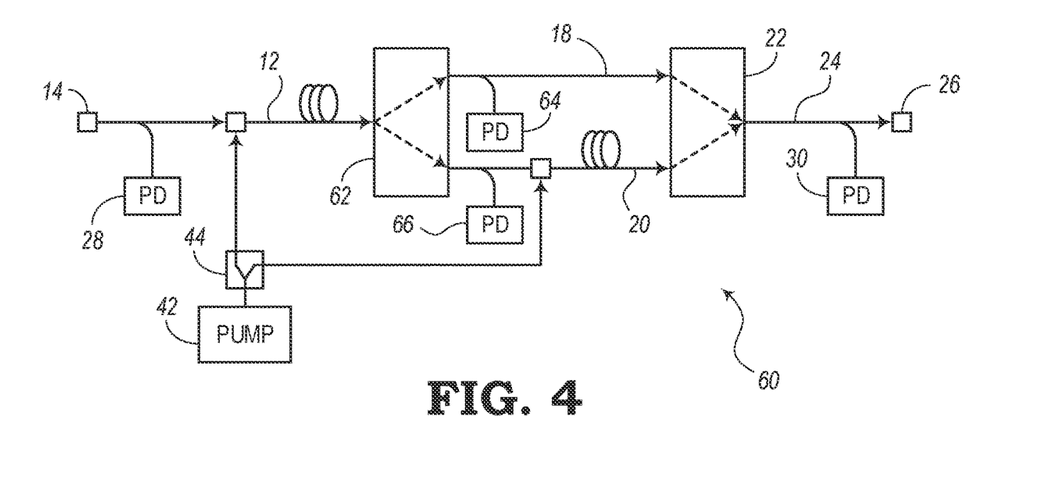

FIG. 3 is a schematic diagram of an embodiment of an optical amplifying device 50, which has many similarities to the optical amplifying devices 10, 40 of FIGS. 1 and 2. In place of the detection device 28 (e.g., photo-detector), the embodiment of FIG. 3 may instead include an optical splitter 52 (e.g., C/L band splitter) that is tapped into the shared optical coil 12. The optical splitter 52 may be configured for splitting channels, whereby channels in the first band (e.g., C-band) are provided to a first detector 54 (e.g., first photo-detector) and channels in the second band (e.g., L-band) are provided to a second detector 56 (e.g., second photo-detector). The optical splitter 52 and detectors 54, 56 allow for automatic detection of whether traffic is in the C-band or L-band and sets the switches of the first and second junctions 16, 22 (e.g., switches) accordingly. This may be considered to be an active switching configuration. In FIG. 4 described below, a semi-passive alternative is provided.

FIG. 4 is a schematic diagram showing an embodiment of an optical amplifying device 60, which has many similarities to the optical amplifying devices 10, 40, 50 described with respect to FIGS. 1-3. Instead of a splitter and switch combination, as described in FIG. 3, the embodiment of FIG. 4 includes a replacement with the first junction 16, that is, replacing the 1×2 switch (associated with the embodiments of FIGS. 1-3) with an optical splitter 62 (e.g., C/L band splitter, C/L filter, etc.). In this regard, the optical splitter 62 may be passive splitter. Also, instead of the first and second detectors 54, 56 at the input port 14, a first detector 64 can be placed at or near the input end of the first-band optical fiber 18 immediately after the optical splitter 62. Also, a second detector 66 can be placed at or near the input end of the second-band optical coil 20 immediately after the optical splitter 62. In the embodiment of FIG. 4, the second junction 22 can be configured as a 2×1 optical switch (similar to the embodiments of FIGS. 1-3) and may be controlled by the detectors 64, 66.

Figure 5:
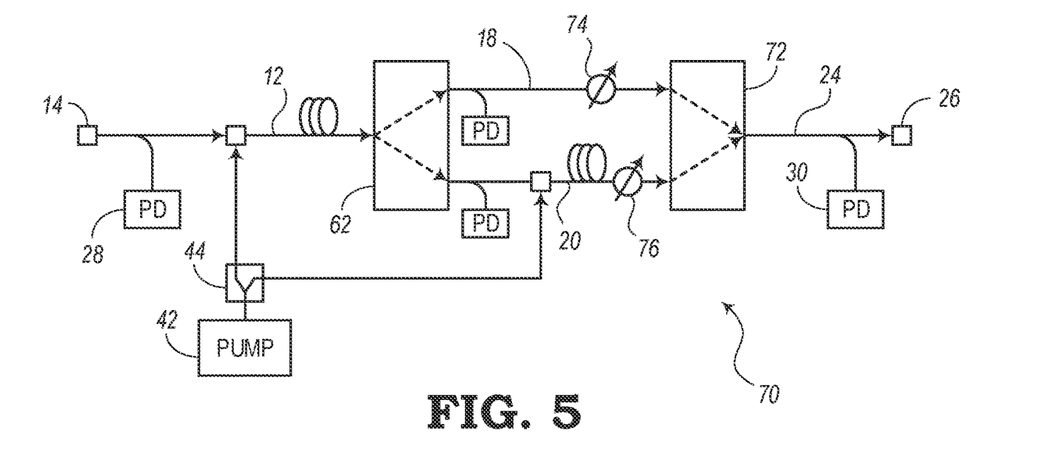

FIG. 5, according to another embodiment, shows an optical amplifying device 70 similar to the previous embodiments of optical amplifying devices 10, 40, 50, 60. However, in the optical amplifying device 70, the first junction 62 and a second junction 72 are both configured as passive optical splitters and may be similar in some respects to the optical splitter 62 shown in FIG. 4. The photo-detectors (PDs) at the output of the optical splitter 62 enable automatic detection of whether traffic is in the C-band or L-band and may set the switches of the optical splitters 62, 72 accordingly. When implemented as a passive system, the optical amplifying device 70 may include a Variable Optical Attenuator (VOA) 74 on the first-band optical fiber 18 and a VOA 76 on the second band optical coil 20. The VOA 74 may be configured to reduce C-band noise from the shared coil 12 if an L-band signal is present at the input port 14. Also, the VOA 76 may be configured to reduce L-band noise from the shared coil 12 if a C-band signal is present at the input port 14. The VOAs 74, 76 may be configured automatically depending on which band the signal is on. Therefore, the embodiment of FIG. 5 may be referred to as an all-passive (or mostly-passive) design with the two passive optical splitters 62, 72.

Amplifier Arrays

The following diagrams, including FIGS. 6-9, depict various layouts of arrays of optical amplifiers. In the following examples, each array includes and variable number (N) of single-channel amplifiers, such as the single-channel amplifying arrangement of the optical amplifier devices 10, 40, 50, 60, 70 described above with respect to FIGS. 1-5. However, instead of a single amplifier, the arrays of FIGS. 6-9 include multiple amplifiers in parallel for amplifying a number of signals (N) independently from either of the two independent bands (e.g., C-band and L-band). Extending to four, eight, or other number of N parallel, independent optical amplifiers is also feasible using a modular approach. In some embodiments, the array size N may be four, eight, or any suitable number. The array of amplifiers can be co-packaged into a single module and can be integrated into a multi-channel coherent modem card. The configurations may be optimized based on the design option, the pump choice, the desired output signal level, and/or other factors.

Figure 6:
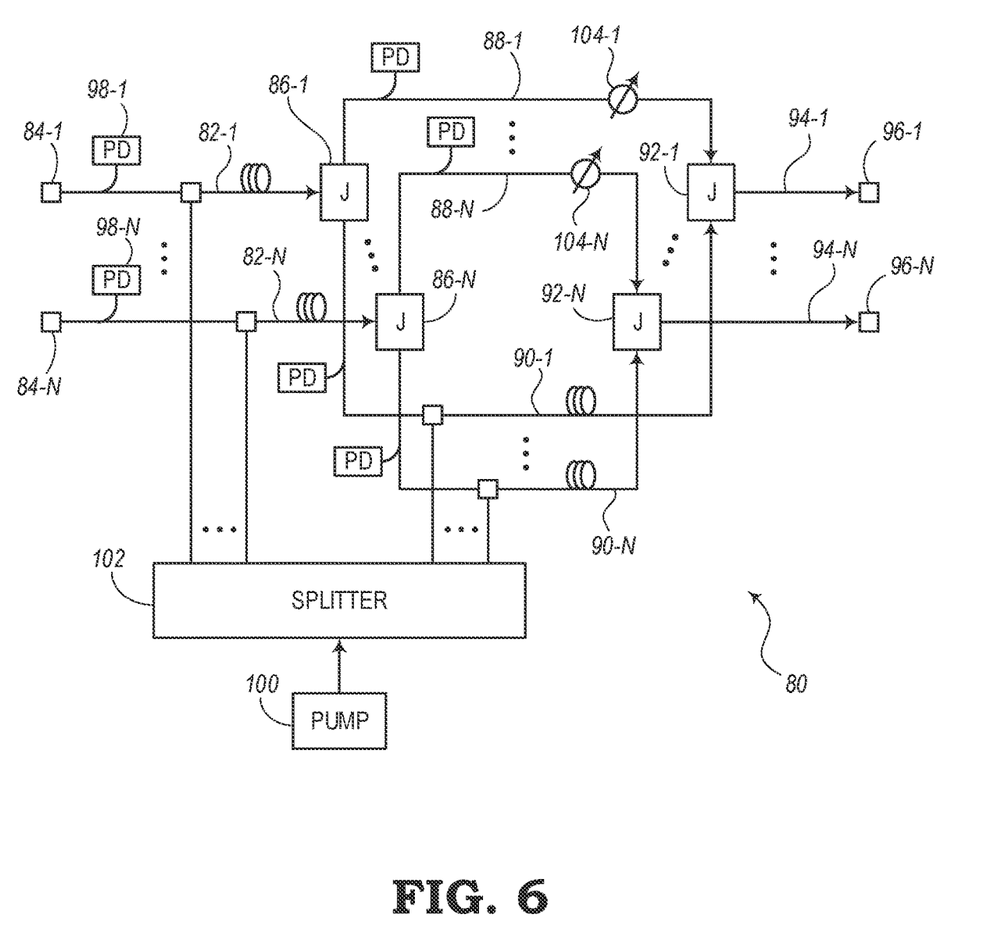
FIGS. 6-9 are schematic diagrams illustrating examples of different optical amplifier arrays having similarities with one another, according to various embodiments of the present disclosure.

FIG. 6 is a schematic diagram illustrating an embodiment of an optical amplifier array 80. In this embodiment, the optical amplifier array 80 includes N parallel optical amplifying devices. The optical amplifier array 80 is configured to amplify optical signals in a plurality of N parallel paths, each including a single channel. The optical amplifier array 80 includes shared optical coils 82-1, . . . , 82-N (e.g., Erbium- Doped Fiber (EDF) coils) for receiving optical signals from a plurality of input ports 84-1, ..., 84-N. For example, the optical signals received by the shared optical coils 82-1, ..., 82-N may reside in any single channel within two optical bands (e.g., the C-band and the L-band).

In addition, the optical amplifier array 80 includes first junctions 86-1, ..., 86-N that are configured to propagate the respective optical signals from the shared optical coils 82-1, ..., 82-N to one or both of corresponding first-band optical fibers 88-1, ..., 88-N and second-band optical coils 90-1, ..., 90-N (e.g., EDF coils). The first junctions 86-1, ..., 86-N may be configured to separate the respective optical signal such that channels in the first optical band (e.g., C-band) are applied to the first-band optical fiber 88-1, ..., 88-N and channels in the second optical band (e.g., L-band) are applied to the second-band optical coil 90-1, ..., 90-N, respectively. The optical amplifier array 80 further includes second junctions 92-1, ..., 92-N, which may be configured to combine the respective first-band optical fiber 88-1, ..., 88-N and second-band optical coil 90-1, ..., 90-N together to be applied to corresponding output paths 94-1, ..., 94-N that are connected, respectively, to output ports 96-1, ..., 96-N.

The first junctions 86-1, ..., 86-N may be configured as a 1×2 optical switches, optical splitters, or bandpass filter devices. The second junctions 92-1, ..., 92-N may be configured as 2×1 optical switches, optical splitters, bandpass filter devices, or optical couplers. The separating or switching actions are performed at the junctions 86, 92 to enable propagation, respectively, on one or both of each of the pairs of parallel paths of first-band optical fibers 88 or second-band optical coils 90. The shared optical coils 82, first-band optical fibers 88, second-band optical coils 90, and output paths 94 may include Erbium-Doped Fiber (EDF) coils.

Furthermore, the optical amplifier array 80 may include input detection devices 98-1, ..., 98-N tapped into the respective shared optical coils 82-1, ..., 82-N near the respective input port 84-1, ..., 84-N for detecting the optical signal received on the corresponding shared optical coil 82-1, ..., 82-N. The input detection devices 98-1, ..., 98-N may be photo-detectors. In some embodiments, the input detection devices 98-1, ..., 98-N may be configured to detect whether the corresponding optical signal resides in a channel of a plurality of channels in the first optical band (e.g., the C-band) or resides in a channel of a plurality of channels in the second optical band (e.g., the L-band). In some embodiments, the input detection devices 98-1, ..., 98-N may each provide an indication to the respective first junction 86-1, ..., 86-N (e.g., 1×2 optical switch) to switch the optical signal to the first-band optical fiber 88 if it resides in one or more of the channels in the first optical band or to switch the optical signal to the second-band optical coil 90 if it resides in one or more of the channels in the second optical band. Also, the optical amplifier array 80 includes detection devices (e.g., PDs) on the first-band optical fibers 88-1, ..., 88-N and detection devices (e.g., PDs) on the second-band optical coils 90-1, ..., 90-N.

Figure 8:
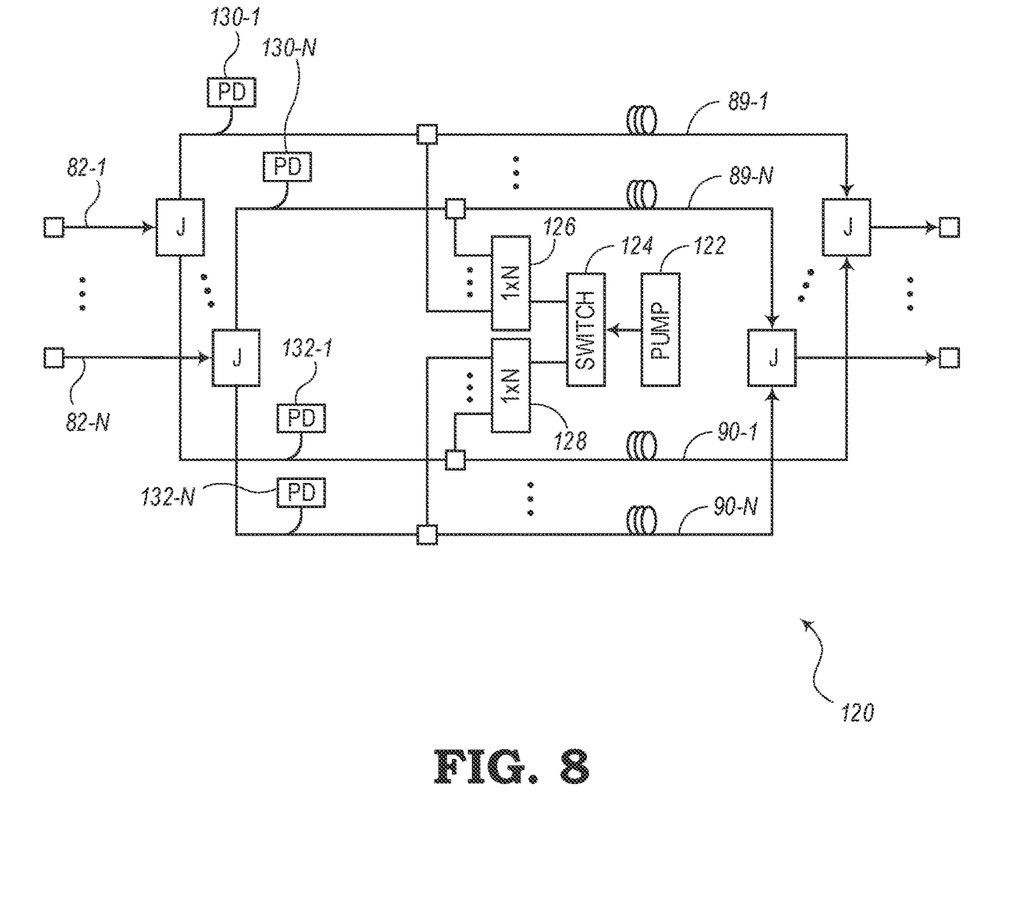
Figure 9:
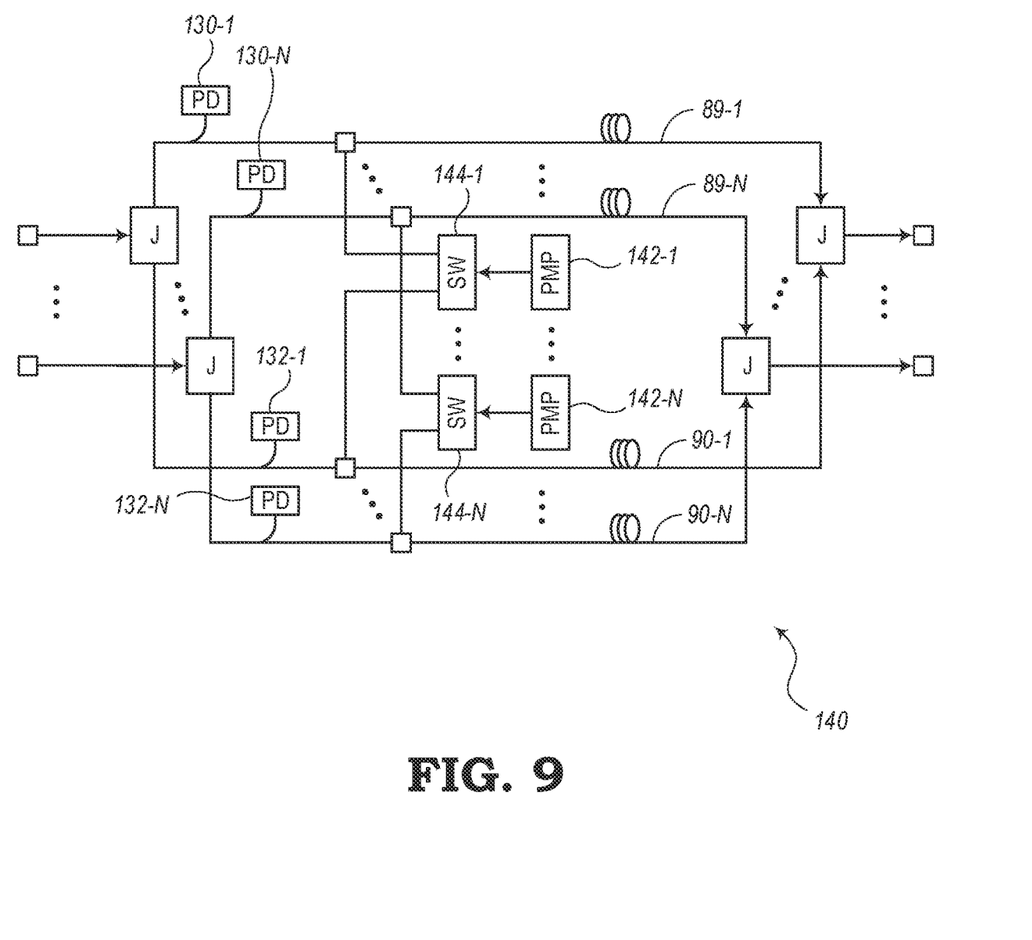

Also, the optical amplifier array 80 of FIG. 6 may include a single optical pump 100, whereby other embodiments of optical amplifier arrays may include two optical pumps (e.g., FIG. 7) or N pumps (e.g., FIG. 9). The single optical pump 100 may be configured with a single splitter 102, whereby the embodiments described with respect to FIGS. 7 and 8 may have two splitters (i.e., one for each band). The single optical pump 100 may be configured as a laser amplifying pump device that may be tapped into the various paths of the optical amplifier array 80, via the single splitter 102 for providing amplification. The single splitter 102 is configured to control how much amplification is applied to the shared optical coils 82-1, ... 82-N and how much is applied to the second-band optical coils 90-1, ..., 90-N. Again, it should be recognized that the pumping functionality of the single optical pump 100 and the single splitter 102 may result in the first-band optical fibers 88-1, ..., 88-N propagating the optical signal of channels in the first band having been amplified once in the shared path (e.g., the corresponding shared optical coil 82) and the second-band optical coil 90-1, ..., 90-N propagating the optical signal of channels in the second band having been amplified twice (i.e., once in the corresponding shared optical coil 82 and another time in the second-band optical coil 90). VOA devices 104-1, ..., 104-N may be included in the first-band optical fibers 88-1, ..., 88-N for reducing noise from the shared coil 82 in the first band if the junctions 86, 92 include optical splitters or couplers (instead of switches).

Figure 7:
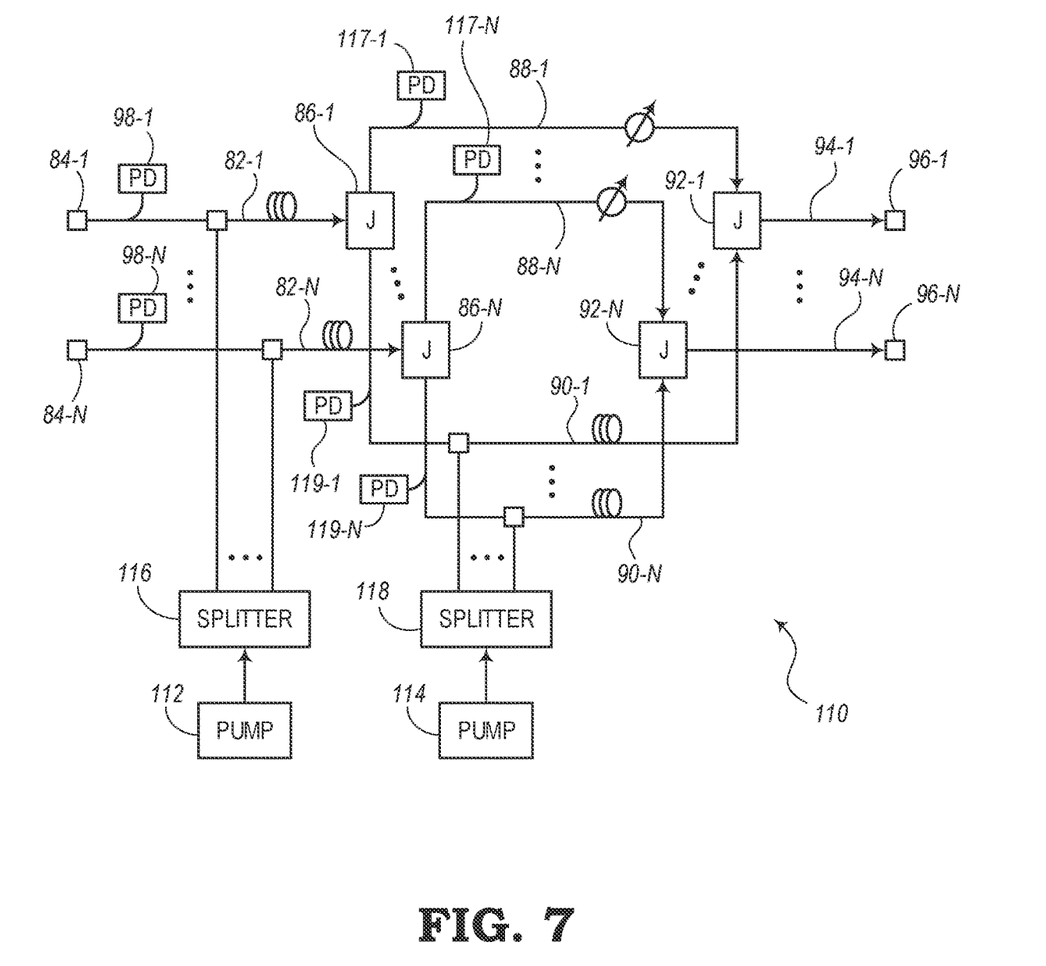

FIG. 7 is a schematic diagram showing an embodiment of another optical amplifier array 110, which may have many similarities to the embodiment described with respect to FIG. 6. However, in the embodiment of FIG. 7, the optical amplifier array 110 includes a first optical pump 112 and a second optical pump 114. The first and second optical pumps 112, 114 may be configured as laser amplifying pump devices that are tapped into the various paths of the optical amplifier array 110 for providing amplification at different points therein. For example, the first optical pump 112 may operate with a splitter 116 for amplifying the shared signal on each of the shared optical coils 82-1, ..., 82-N, where amplification is a baseline amount. The second optical pump 114 may operate with a splitter 118 for amplifying the optical signal in the second-band (e.g., L-band) on each of the second-band optical coils 90-1, ..., 90-N. The second optical pump 114 may be configured for providing extra amplification for signals operating in a lower frequency (i.e., higher wavelength) optical range in which a greater amplification may be needed. As shown in the embodiment of FIG. 7, the first optical pump 112 and the second optical pump 114 are configured to pump (amplify) the shared optical coils 82 and the second-band (e.g., L-band) optical coils 90 independently to allow for controllable levels of amplification for the first band (e.g., C-band) and the second band (e.g., L-band) as needed. The optical amplifier array 110 also includes detectors (e.g., PDs) 117-1, ..., 117-N on the first-band optical fibers 88-1, ..., 88-N and detectors (e.g., PDs) 119-1, ..., 119-N on the second-band optical coils 90-1, ..., 90-N. The pairs of detectors 117/119 may be used to automatically detect the signal presence and set the 1×2 or 2×1 switches of the junctions 86, 92 according to the detected signal path.

FIG. 8 is a schematic diagram illustrating another embodiment of an optical amplifier array 120, which may include many of the same or similar components as described with respect to the embodiments of FIGS. 6 and 7. In the embodiment of FIG. 8, however, the optical amplifier array 120 may include a single optical pump 122, a 1×2 switch 124, a first-band splitter 126, and a second-band splitter 128. The 1×2 switch 124 may be configured to switch between the first band or the second band, which may depend on the sensed states of first-band detectors 130-1, ... 130-N on first-band optical coils 89-1, ..., 89-N and the sensed states of second-band detectors 132-1, ..., 132-N on the second-band optical coils 90-1, ..., 90-N. The single optical pump 122 is shared by both bands (e.g., C-band and L-band) and uses the 1×2 switch 124 and separate splitters 126, 128 for application to the two sets of coils for the different bands (e.g., C-band and L-band EDF coils). The 1×2 switch 124 may be configured to switch to one or both bands based on any signal presence detected by detectors 130, 132 either in the first band (e.g., C-band) or the second band (e.g., L-band).

The first-band splitter 126 and second-band splitter 128 may be configured as 1×N splitters. The first-band splitter 126 is configured to split the first-band amplification (i.e., provided by the single pump 122 and switched by the 1×2 switch 124) among the first-band optical coils 89-1, ..., 89-N. Similarly, the second-band splitter 128 is configured to split the second-band amplification (i.e., provided by the single pump 122 and switched by the 1×2 switch 124) among the second-band optical coils 90-1, ..., 90-N.

FIG. 9 is a schematic diagram illustrating another embodiment of an optical amplifier array 140, which may have many similarities to the embodiments of FIGS. 6-8. In this embodiment, the optical amplifier array 140 may include N pumps 142-1, ..., 142-N for providing amplification individually for each of the N channels. Also, the optical amplifier array 140 includes 1×2 switches 144-1, ..., 144-N, each corresponding to a respective pump 142-1, ..., 142-N. Each of the 1×2 switches 144-1, ..., 144-N is configured to switch between a corresponding first-band optical coil 89-1, ..., 89-N or second-band optical coil 90-1, ..., 90-N. The switching action of the 1×2 switches 144 may depend on the presence of signals detected by the first-band detectors 130-1, ..., 130-N on the first-band optical coils 89-1, ..., 89-N and the presence of signals detected by the second-band detectors 132-1, ..., 132-N on the second-band optical coils 90-1, ..., 90-N. The pumps 142-1, ..., 142-N may be referred to as dedicated pumps for amplifying each signal within a channel of the first or second band. The 1×2 switches 144-1, ..., 144-N are configured to direct between C-band and L-band coils. Upon auto-detection of a valid signal by detectors 130, 132, the respective pumps 142 can be turned on and the respective 1×2 switch 144 can be set accordingly.

Amplifiers with Pre-Combiners

The following diagrams (i.e., FIGS. 10-12) are directed to configuration layouts of amplifier devices having a pre-combiner and N-channel amplification for operating on signals in the two bands (e.g., C-band and L-band). The N-channel amplification portions of the amplifier devices of FIGS. 10-12 may be configured in a way that is the same as or similar to the single-channel amplifying configurations of the optical amplifying devices 10, 40, 50, 60, and 70 shown with respect to FIGS. 1-5. However, in order to manage a number of channels (N), the amplifier devices of FIGS. 10-12 further include an N×1 pre-combiner device. In some respects, the N×1 pre-combiner devices may be configured in place of the arrays of amplifier components as described with respect to FIGS. 6-9.

Figure 10:
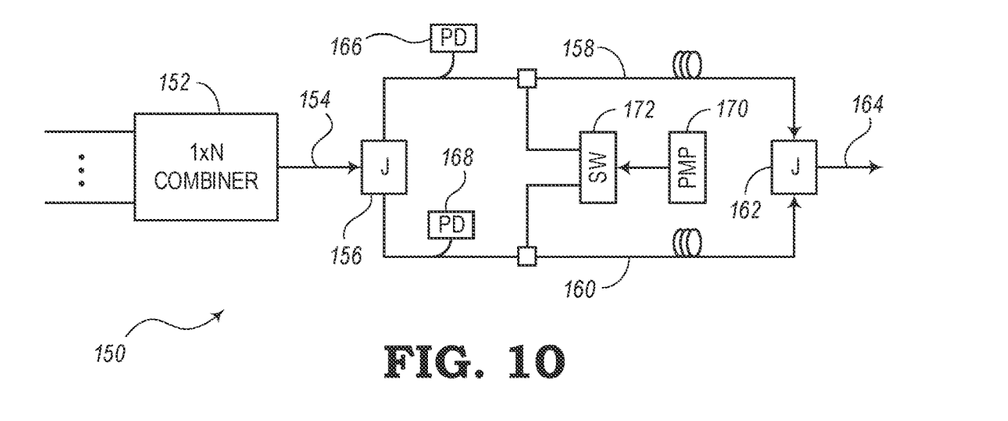
FIGS. 10-12 are schematic diagrams illustrating examples of different amplifier devices having similarities with one another, according to various embodiments of the present disclosure.

FIG. 10 is a schematic diagram showing an embodiment of an amplifier device 150. In this embodiment, the amplifier device 150 may include a N×1 combiner 152 (or pre-combiner) for combining N channels at an input thereof and providing one channel at an output thereof. The N×1 combiner 152 may be configured as a multiplexer for combining input signals to be amplified. The optical signal of a selected single channel within the two optical bands (e.g., the C-band and the L-band) is provided to a shared optical coil 154. From the shared optical coil 154, the optical signal is provided to a first junction 156 that is configured to propagate the optical signal from the shared optical coil 154 to one or both of a first-band optical coil 158 and a second-band optical coil 160. The first junction 156 may be configured to separate the optical signal such that channels in the first optical band (e.g., C-band) are applied to the first-band optical coil 158 and channels in the second optical band (e.g., L-band) are applied to the second-band optical coil 160.

The amplifier device 150 further includes a second junction 162, which may be configured to combine the first-band optical coil 158 and the second-band optical coil 160 together to be applied to an output path 164. According to the embodiments of FIGS. 10-12, the first junction 156 may be configured as a 1×2 optical switch, a splitter, a bandpass filter, or other suitable device. The second junction 162 may be configured as a 2×1 optical switch, a splitter, a bandpass filter, a coupler, or other suitable device. In the embodiment of FIG. 10, the second junction 162 is configured as a coupler. The first and second junctions 156, 162 are configured to enable propagation on one or both of the two parallel paths (i.e., first-band optical coil 158 and second-band optical coil 160). Some or all of the shared optical coil 154, the first-band optical coil 158, the second-band optical coil 160, and the output path 164 may be configured as Erbium-Doped Fiber (EDF) coils.

The amplifier device 150 may further include a first detector 166 configured for detecting a signal on the first-band optical coil 158 and a second detector 168 configured for detecting a signal on the second-band optical coil 160. Also, a pump 170 is shared with the two parallel paths (e.g., the first-band optical coil 158 and the second-band optical coil 160). A 1×2 switch 172 is a configured to provide amplification from the pump 170 to one or both of the first-band optical coil 158 and second-band optical coil 160, as needed. A switching function of the 1×2 switch 172 may depend on the detection status showing the presence of signals as determined by the first and second detectors 166, 168. The signal presence in either the first band (e.g., C-band) or the second band (e.g., L-band) may be automatically detected by the detectors 166, 168 and the 1×2 switch 172 can be set accordingly.

Figure 11:
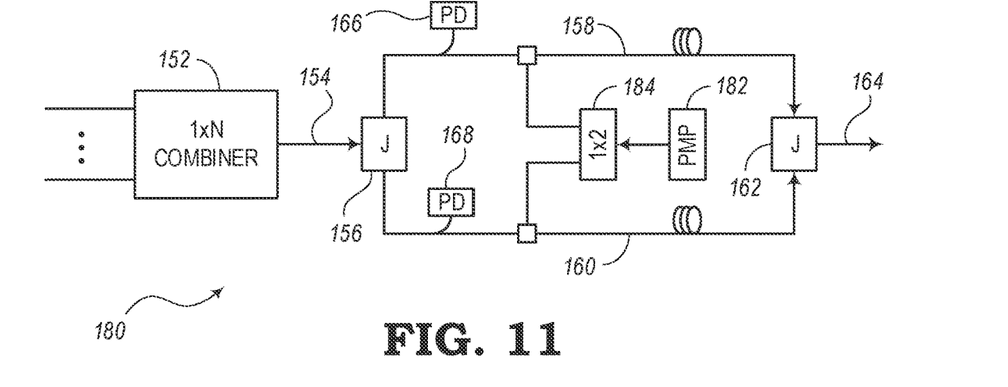

FIG. 11 is a schematic diagram showing an embodiment of another amplifier device 180, which may include many of the same or similar features as described with respect to FIG. 10. In this embodiment, the amplifier device 180 may include a single pump 182 and a 1×2 splitter 184 for splitting the amplification aspects of the single pump 182 to each of the first-band optical coil 158 and the second-band optical coil 160. Also, the second junction 162 may be configured in this embodiment as a 2×1 switch and may be switched accordingly in response to the auto-detection by detectors 166, 168 of signals present on either or both of the coils 158, 160.

Figure 12:
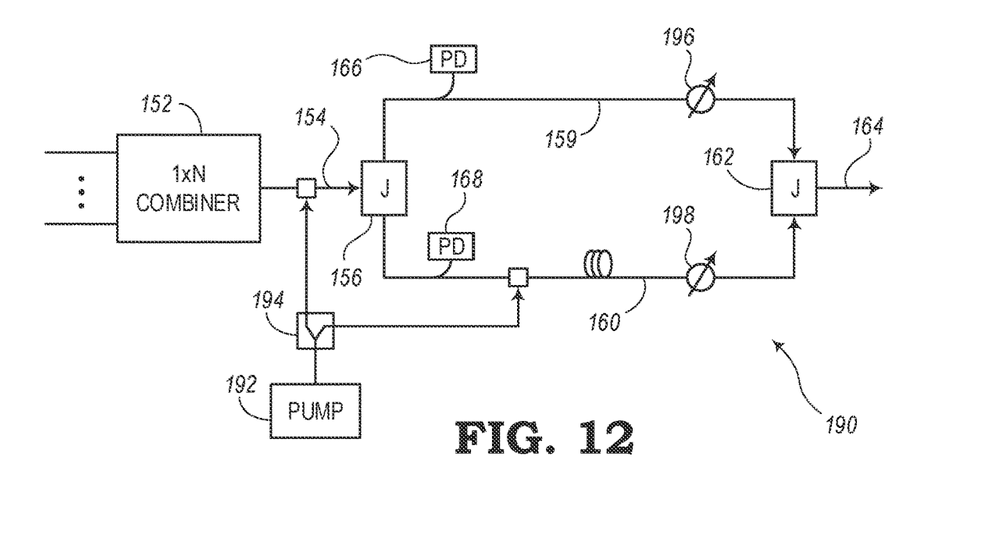

FIG. 12 is a schematic diagram illustrating another embodiment of an amplifier device 190, which may include many of the same or similar features as described with respect to FIGS. 10 and 11. The amplifier device 190 in this embodiment includes a single pump that is configured to provide amplification to the shared optical coil 154 and the second-band optical coil 160 via an optical splitter 194. The shared optical coil 154 may be an EDF coil for the two bands (e.g., C+L-band). According to embodiments in which both junctions 156, 162 are configured as passive optical splitters or C/L band splitters, a first-band optical fiber 159 may include a Variable Optical Attenuator (VOA) 196, which can be automatically controlled to block or pass any noise to the second junction 162 from the shared optical coil 154 based on the signal presence detected by the detectors 166, 168.

According to various embodiments of the present disclosure, an optical amplifying device may include a shared optical coil configured to propagate an optical signal. The optical amplifying device may include a first junction configured to separate the shared optical coil into a first-band optical coil and a second-band optical coil. A pump device may be configured to amplify the optical signal in both the first-band optical coil and the second-band optical coil. The first-band optical coil may be configured to propagate the optical signal when the optical signal resides in a channel of a first plurality of channels within a first optical band. Also, the second-band optical coil may be configured to propagate the optical signal when the optical signal resides in a channel of a second plurality of channels within a second optical band.

In addition, this optical amplifying device may further be defined whereby the first junction may be a 1×2 optical switch. In some embodiments, the optical amplifying device may further include a detection device tapped into the shared optical coil, the detection device being configured to detect whether the optical signal resides in a channel within the first optical band or resides in a channel within the second optical band. The detection device may further be configured to switch the 1×2 switch to the first-band optical coil when the optical signal resides in a channel within the first optical band and switch the 1×2 switch to the second-band optical coil when the optical signal resides in a channel within the second optical band. For example, the detection device may be a photo-detector. Alternatively, the detection device may include a band splitter, a first photo-detector, and a second photo-detector, where the band splitter may be configured to split the optical signal between the first optical band corresponding to the first photo-detector and the second optical band corresponding to the second photo-detector.

In some embodiments, the above-described optical amplifying device may also be defined whereby the first junction is configured as an optical splitter. In this case, the first-band optical coil may include a Variable Optical Attenuator (VOA). Also, the optical amplifying device may include a first photo-detector tapped into the first-band optical coil and a second photo-detector tapped into the second-band optical coil. The first photo-detector may be configured to detect whether the optical signal resides in a channel within the first optical band and the second photo-detector may be configured to detect whether the optical signal resides in a channel within the second optical band.

The optical amplifying device may further include a second junction configured to combine the first-band optical coil and the second-band optical coil to an output path. For example, the second junction may be configured as a 2×1 switch, an optical splitter, a bandpass filter, or a coupler.

In some embodiments, the optical amplifying device may operate whereby the first optical band is the C-band comprising wavelengths in the range from 1528 nm to 1567 nm and the second optical band is the L-band comprising wavelengths in the range from 1570 nm to 1611 nm. Also, the shared optical coil, the first-band optical coil, and the second-band optical coil may be configured as Erbium-Doped Fiber (EDF) coils. In one embodiment, the pump device may include a first pump configured to amplify the optical signal on the shared optical coil and a second pump configured to amplify the optical signal on the second-band optical coil. In another embodiment, the pump device may include an optical pump and a pump splitter for splitting amplification of the optical pump between the shared optical coil and the second-band optical coil. Also, in some embodiments, the optical amplifying device may further comprise a 1×N pre-combiner configured to obtain the optical signals in a plurality of channels and provide a combined optical signal to the shared optical coil.

Additionally, the optical amplifying device may be a single-channel optical amplifier that is arranged in an array of single-channel optical amplifiers. In this case, the pump device may include an optical pump and a splitter, whereby the splitter may be configured to split amplification from the optical pump into a first set amplifications and a second set of amplifications. The splitter may further be configured to provide the first set of amplifications to the respective shared optical coil of each single-channel optical amplifier in the array of single-channel optical amplifiers and to provide the second set of amplifications to the respective second-band optical coil of each single-channel optical amplifier in the array of single-channel optical amplifiers. Also, the pump device may include a first optical pump, a second optical pump, a first splitter, and a second splitter, where the first splitter may be configured to split amplification from the first optical pump into a first set of amplifications and provide the first set of amplifications to the respective shared optical coil of each single-channel optical amplifier in the array of single-channel optical amplifiers. The second splitter may be configured to split amplification from the second optical pump into a second set of amplifications and provide the second set of amplifications to the respective second-band optical coil of each single-channel optical amplifier in the array of single-channel optical amplifiers. The respective first junction of each single-channel optical amplifier in the array of single-channel optical amplifiers may include one or more bandpass filters.

Amplification Processes

Figure 13:
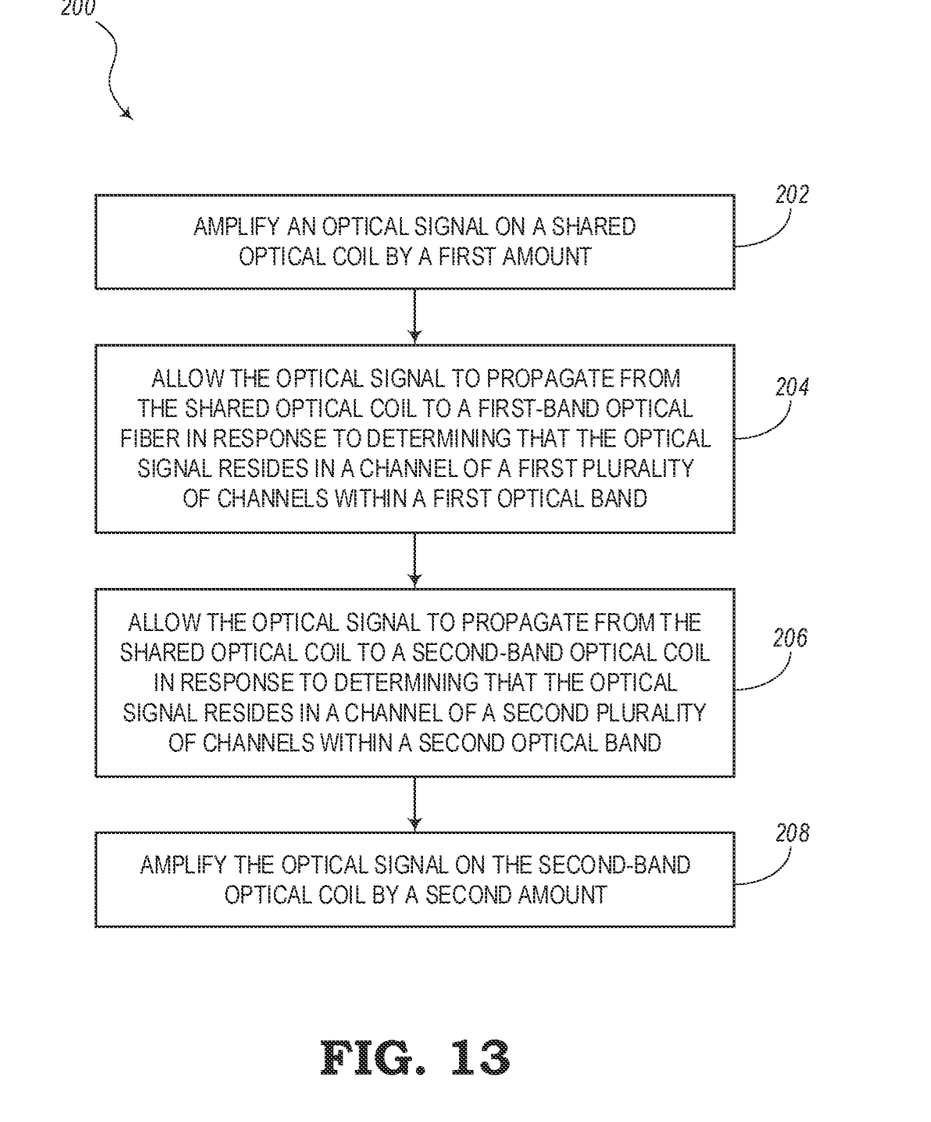
FIG. 13 is a block diagram illustrating a process for propagating and amplifying an optical signal through different parallel paths depending on whether the optical signal resides in a channel of first or second bands, according to various embodiments of the present disclosure.

FIG. 13 is a block diagram illustrating a process 200 for propagating optical signals through different parallel paths depending on whether the optical signals reside in a channel of a first band or in a channel of a second band. In this embodiment, the process 200 also includes amplifying an optical signal on a shared optical coil by a first amount, as indicated in block 202. The process 200 also includes a step of allowing the optical signal to propagate from the shared optical coil to a first-band optical fiber in response to determining that the optical signal resides in a channel of a first plurality of channels within a first optical band, as indicated in block 204. Also, the process 200 includes the step of allowing the optical signal to propagate from the shared optical coil to a second-band optical coil in response to determining that the optical signal resides in a channel of a second plurality of channels within a second optical band, as indicated in block 206. The process 200 further includes the step of amplifying the optical signal on the second-band optical coil by a second amount, as indicated in block 208.

The amplification of signals on the shared optical coil and second-band optical coil results in different amplification amounts on the first-band optical fiber (i.e., essentially equal to the first amount) and the second-band optical coil (i.e., essentially equal to the first amount plus the second amount). Also, switching may include optical switches or a passive splitter, as described with respect to the various embodiments of FIGS. 1-12. In some cases, a VOA may be incorporated in the first-band optical fiber and may be configured to block the optical signal if it resides in the second optical band (e.g., L-band). The VOA in this case may also attenuate to a finite amount or provide no attenuation if the optical signal resides in the first band (e.g., C-band). The process 200 may be modified to include additional and/or alternative steps depending on the various embodiments (FIGS. 1-12) deployed.

Therefore, the embodiments of the present disclosure may operate whereby components can be shared across the C-band and the L-band to take advantage of having channels only in one band at any point in time. This makes it possible to design integrated C+L-band channel or mux/demux amplifiers that are cost-effective and compact. Also, these embodiments may provide truly colorless C+L-band ROADM designs as well as modems that can tune across both bands. The C+L-band EDFAs described in the present disclosure can be automatically configured by detection as to which band is present at the input. Although the embodiments may be described as be associated with a transmitter side of an optical device, it should be noted that the same configurations may also be applied in the receiver components as well.

The embodiments described in the present disclosure are considered to be an improvement over conventional amplification systems. For example, the present embodiments may be configured to integrate two optical bands (e.g., C-band and L-band) together in order to share resources within an optical network element. More particularly, the C+L-band integration may be applied to an Erbium-Doped Fiber Amplifier (EDFA) device of a node or other optical component. As such, the integration of elements for use in the two bands may result in the optimization (or at least an improvement) in power consumption by reducing power needed for two separate band systems.

Another advantage is that the integration of optical components may be packaged together is space-reducing manner. Thus, the design of optical systems can be simplified in that the packaged components can be used in a modular approach for larger port counts (e.g., where N is equal to 4, 8, or higher) based on a "pay as you grow" concept.

Also, the present embodiments may result in a cost savings with the shared pumps, whereby the various configurations of the present disclosure can provide only the channels that are present in only one band at a time. As such, the embodiments of the present disclosure may also be configured as simplified amplifiers with control based on the auto-detection of a signal band.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An optical amplifying device comprising:
 a first-band optical coil for a first optical band;
 a second-band optical coil for a second optical band;
 a first junction connected to a shared optical coil and configured to separate the first-band optical coil into a first-band optical fiber and a second-band optical coil into a second-band optical fiber based on which band a channel of an optical signal resides in;
 a detection device located prior to any optical coil, relative to a direction of optical propagation, and configured to detect signal presence on the first-band optical fiber and on the second-band optical coil;
 a pump device configured to amplify optical signals; and
 an optical switch configured to switch an output of the pump device between the first-band optical fiber and the second-band optical fiber responsive to the detected signal presence by the detection device;
 wherein the first-band optical fiber is configured to propagate the optical signal when the optical signal resides within the first optical band;
 wherein the second-band optical coil is configured to propagate the optical signal when the optical signal resides within the second optical band; and
 wherein the optical amplifying device is a single-channel optical amplifier in an array of single-channel optical amplifiers, wherein the pump device includes an optical pump and a splitter, the splitter configured to split signals from the optical pump into a first set of signals and a second set of signals, the splitter further configured to provide the first set of signals to a respective first-band optical coil of each single-channel optical amplifier in the array of single-channel optical amplifiers and to provide the second set of signals to a respective second-band optical coil of each single-channel optical amplifier in the array of single-channel optical amplifiers.

2. The optical amplifying device of claim 1, wherein the first junction is a 1×2 optical switch.

3. The optical amplifying device of claim 2, wherein detection device is configured to detect whether the optical signal resides in a channel within the first optical band or resides in a channel within the second optical band, the detection device is further configured to switch the 1×2 optical switch to the first-band optical fiber when the optical signal resides in a channel within the first optical band and switch the 1×2 optical switch to the second-band optical coil when the optical signal resides in a channel within the second optical band.

4. The optical amplifying device of claim 3, wherein the detection device includes a photo-detector.

5. The optical amplifying device of claim 3, wherein the detection device includes a band splitter, a first photo-detector, and a second photo-detector, the band splitter configured to split the optical signal between the first optical band corresponding to the first photo-detector and the second optical band corresponding to the second photo-detector.

6. The optical amplifying device of claim 1, wherein the first junction is configured as an optical splitter.

7. The optical amplifying device of claim 6, wherein the first-band optical fiber includes a Variable Optical Attenuator (VOA).

8. The optical amplifying device of claim 6, wherein the detection device includes a first photo-detector tapped into the first-band optical fiber and a second photo-detector tapped into the second-band optical fiber, wherein the first photo-detector is configured to detect whether the optical signal resides in a channel within the first optical band and the second photo-detector is configured to detect whether the optical signal resides in a channel within the second optical band.

9. The optical amplifying device of claim 1, further comprising a second junction configured to combine the first-band optical fiber and the second-band optical fiber to an output path.

10. The optical amplifying device of claim 9, wherein the second junction is configured as a 2×1 optical switch, an optical splitter, a bandpass filter, or a coupler.

11. The optical amplifying device of claim 1, wherein the first optical band is the C-band comprising wavelengths in the range from about 1528 nm to 1567 nm and the second optical band is the L-band comprising wavelengths in the range from about 1570 nm to 1611 nm.

12. The optical amplifying device of claim 1, wherein the first-band optical coil and the second-band optical coil are Erbium-Doped Fiber (EDF) coils.

13. The optical amplifying device of claim 1, wherein the pump device comprising a first pump configured to amplify the optical signal on the first-band optical coil and a second pump configured to amplify the optical signal on the second-band optical coil.

14. The optical amplifying device of claim 1, wherein the pump device comprising an optical pump and a pump splitter for splitting amplification of the optical pump between the first-band optical coil and the second-band optical coil.

15. The optical amplifying device of claim 1, wherein a respective first junction of each single-channel optical amplifier in the array of single-channel optical amplifiers includes one or more bandpass filters.

16. The optical amplifying device of claim 1, further comprising a 1×N pre-combiner configured to obtain optical signals in a plurality of channels and provide a combined optical signal to the first-band optical coil.

17. An optical amplifying device comprising:
a first-band optical coil for a first optical band;
a second-band optical coil for a second optical band;
a first junction connected to a shared optical coil and configured to separate the first-band optical coil into a first-band optical fiber and a second-band optical coil into a second-band optical fiber based on which band a channel of an optical signal resides in;
a detection device located prior to any optical coil, relative to a direction of optical propagation, and configured to detect signal presence on the first-band optical fiber and on the second-band optical coil;
a pump device configured to amplify optical signals; and
an optical switch configured to switch an output of the pump device between the first-band optical fiber and the second-band optical fiber responsive to the detected signal presence by the detection device;
wherein the first-band optical fiber is configured to propagate the optical signal when the optical signal resides within the first optical band;
wherein the second-band optical coil is configured to propagate the optical signal when the optical signal resides within the second optical band; and
wherein the optical amplifying device is a single-channel optical amplifier in an array of single-channel optical amplifiers, wherein the pump device includes a first optical pump, a second optical pump, a first splitter, and a second splitter, wherein the first splitter is configured to split signals from the first optical pump into a first set of signals and provide the first set of signals to a respective first-band optical coil of each single-channel optical amplifier in the array of single-channel optical amplifiers, and wherein the second splitter is configured to split signals from the second optical pump into a second set of signals and provide the second set of signals to a respective second-band optical coil of each single-channel optical amplifier in the array of single-channel optical amplifiers.

18. The optical amplifying device of claim 17, wherein the first junction is a 1×2 optical switch.

19. The optical amplifying device of claim 17, wherein the first optical band is the C-band comprising wavelengths in the range from about 1528 nm to 1567 nm and the second optical band is the L-band comprising wavelengths in the range from about 1570 nm to 1611 nm.

20. The optical amplifying device of claim 17, wherein the first-band optical coil and the second-band optical coil are Erbium-Doped Fiber (EDF) coils.

* * * * *